(12) United States Patent
Nakanishi et al.

(10) Patent No.: US 11,555,545 B2
(45) Date of Patent: Jan. 17, 2023

(54) ELECTROMAGNETIC VALVE

(71) Applicant: NIDEC TOSOK CORPORATION, Kanagawa (JP)

(72) Inventors: Tomohiko Nakanishi, Kanagawa (JP); Junichi Sakashita, Kyoto (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 17/486,915

(22) Filed: Sep. 28, 2021

(65) Prior Publication Data

US 2022/0099193 A1 Mar. 31, 2022

(30) Foreign Application Priority Data

Sep. 30, 2020 (JP) .............................. JP2020-165775

(51) Int. Cl.
*F16K 1/36* (2006.01)
*F16K 27/02* (2006.01)
*F16K 31/06* (2006.01)

(52) U.S. Cl.
CPC .............. *F16K 1/36* (2013.01); *F16K 27/029* (2013.01); *F16K 31/0644* (2013.01); *F16K 31/0675* (2013.01)

(58) Field of Classification Search
CPC ...... F16K 1/36; F16K 27/029; F16K 31/0644; F16K 31/0675; F16K 31/0655
See application file for complete search history.

(56) References Cited

U.S. PATENT DOCUMENTS

| | | | | |
|---|---|---|---|---|
| 3,295,079 | A | * 12/1966 | Brown | .................. H01F 7/1607 335/278 |
| 6,702,252 | B2 | * 3/2004 | Ben-Asher | .......... F16K 31/0655 251/129.2 |
| 10,816,104 | B2 | 10/2020 | Chen et al. | |

* cited by examiner

*Primary Examiner* — Eric Keasel
(74) *Attorney, Agent, or Firm* — Hauptman Ham, LLP

(57) ABSTRACT

An electromagnetic valve includes: a solenoid having a plunger movably supported along an axial direction; a flow path member having a fluid passage flow path and a valve element housing portion; and a valve element disposed in the valve element housing portion and movable along the axial direction together with the plunger. The valve element includes: a body part in a tubular shape having a wall portion closing one axial end side and an opening at the other axial side; a valve part fixed to one axial side of the wall portion for opening and closing the flow path as moving together with the plunger; and a core member in a columnar shape that is movable along the axial direction inside the body part, and that is in contact with the wall portion on the one axial side and the plunger on the other axial side.

10 Claims, 4 Drawing Sheets

ELECTROMAGNETIC VALVE

CROSS-REFERENCE TO RELATED APPLICATIONS

The present invention claims priority under 35 U.S.C. § 119 to Japanese Patent Application No. 2020-165775 filed on Sep. 30, 2020, the entire content of which is incorporated herein by reference.

FIELD OF THE INVENTION

The present invention relates to an electromagnetic valve.

BACKGROUND

Electromagnetic valves are known in which a flow of fluid such as gas, or water or oil, is switched, or passage and interruption of the fluid are switched. Conventional electromagnetic valves are mounted on, for example, a vehicle including an internal combustion engine such as an engine, and can switch between passage and interruption of a blow-by gas.

These electromagnetic valves each include a nozzle unit having a valve element that opens and closes a flow path through which a fluid passes, and a solenoid unit that is in contact with the valve element and has a plunger that moves the valve element by excitation.

The conventional electromagnetic valves are each configured such that the plunger is in contact with an end surface of a valve element in a columnar shape to press the valve element. In this case, the valve element is pressed at its portion far away from a portion (elastic body portion) that opens and closes a flow path, so that an attitude of the valve element may not be maintained to cause an axis of the valve element to be displaced, and thus the valve element may be less likely to move smoothly.

SUMMARY

An electromagnetic valve according to an aspect of the present invention includes: a solenoid having a bobbin in a tubular shape provided with a through-hole passing through the bobbin along an axial direction, a plunger inserted in the through-hole and movably supported along the axial direction, and a coil wound around an outer peripheral portion of the bobbin and generating a magnetic force with energization to move the plunger in the axial direction; a flow path member provided with a fluid passage flow path having a first flow path, a second flow path, and a relay flow path disposed between the first flow path and the second flow path to allow the first flow path to communicate with the second flow path, and a valve element housing portion having a tubular space communicating with the relay flow path, the flow path member being coupled to the solenoid; and a valve element disposed in the valve element housing portion and movable along the axial direction together with the plunger, the valve element including: a body part in a tubular shape that is provided on one axial end side with a wall portion closing the body part and on the other axial side with an opening; a valve part that is fixed to one axial side of the wall portion and that opens and closes the relay flow path as the plunger moves; and a core member in a columnar shape that is disposed movably along the axial direction inside the body part and that is in contact with the wall portion on one axial side, and is in contact with the plunger on the other axial side.

The above and other elements, features, steps, characteristics and advantages of the present disclosure will become more apparent from the following detailed description of the preferred embodiments with reference to the attached drawings.

DETAILED DESCRIPTION

With reference to FIGS. 1 to 4, an embodiment of an electromagnetic valve of the present invention will be described. In the following description, for convenience of explanation, three axes orthogonal to each other are set as an X-axis, a Y-axis, and a Z-axis. As an example, an XY-plane including the X-axis and the Y-axis is horizontal, and the Z-axis is vertical. A direction parallel to the X-axis may be referred to as an "axial direction (axis O1 direction)", a radial direction centered on this axis may be simply referred to as a "radial direction", and a circumferential direction centered on the axis may be simply referred to as a "circumferential direction". Additionally, a positive side in an X-axis direction may be referred to as "one axial side" or simply as "one side", and a negative side in the X-axis direction may be referred to as "the other axial side" or simply as "the other side". In the present specification, a vertical direction, a horizontal direction, an upper side, and a lower side are simply names for describing a relative positional relationship of each part, and thus an actual placement relationship or the like may be a placement relationship or the like other than the placement relationship or the like indicated by these names.

Figure 1:
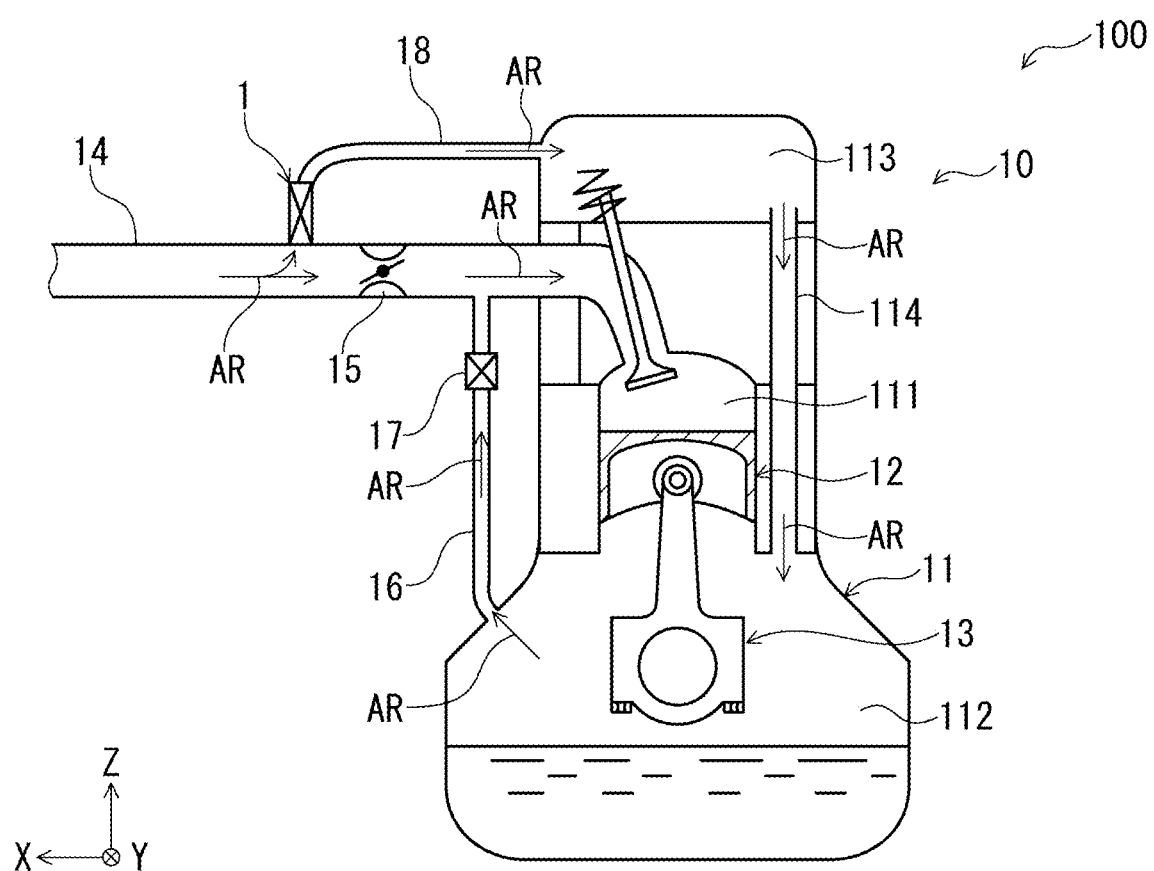
FIG. 1 is a diagram illustrating an example of a use state of an electromagnetic valve (open state) of the present invention.
Figure 2:
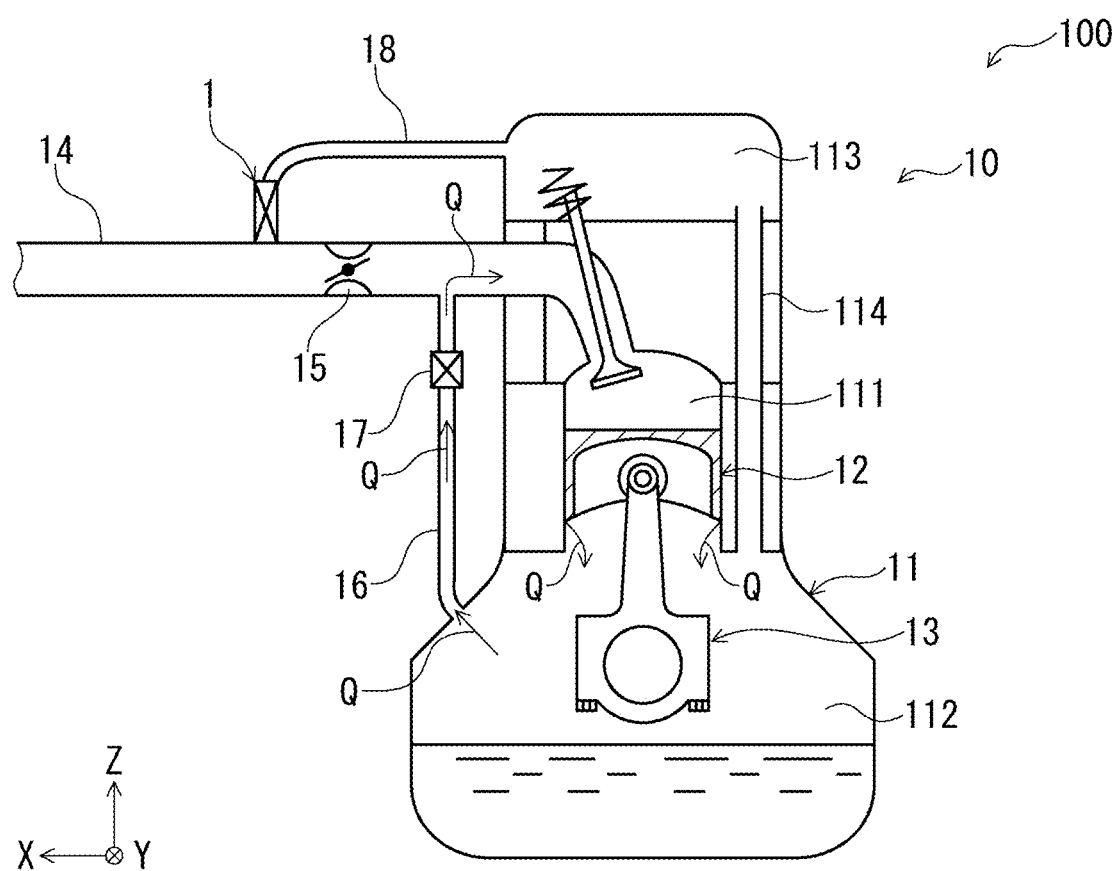
FIG. 2 is a diagram illustrating an example of a use state of the electromagnetic valve (closed state) of the present invention.

As illustrated in FIGS. 1 and 2, an electromagnetic valve 1 is used by being mounted on a vehicle 100 including an internal combustion engine 10 such as an engine, for example. The internal combustion engine 10 includes a housing 11 having a combustion chamber 111, a crank chamber 112, and a buffer chamber 113, a piston 12 movably provided in the combustion chamber 111, and a crank 13 provided in the crank chamber 112 to convert reciprocating motion of the piston 12 into rotational motion.

In the housing 11, the crank chamber 112 and the buffer chamber 113 are connected using an internal flow path 114.

To the combustion chamber 111, an external flow path 14 is connected from outside the housing 11. The external flow path 14 is provided midway with an electromagnetic valve 15 that is a throttle valve.

The external flow path 14 has a downstream side from the electromagnetic valve 15, being connected to the crank chamber 112 using a first auxiliary flow path 16. The first auxiliary flow path 16 is provided midway with an electromagnetic valve 17 that is a PCV valve.

The external flow path 14 has an upstream side from the electromagnetic valve 15, being connected to the buffer chamber 113 using a second auxiliary flow path 18. The second auxiliary flow path 18 is provided with the electromagnetic valve 1 of the present invention at a boundary portion between the external flow path 14 and the second auxiliary flow passage 18. The electromagnetic valve 1 switches opening and closing of the external flow path 14. The electromagnetic valve 1 causes the external flow path 14 (see FIG. 1) to be an open state during normal traveling of the vehicle 100, and causes the external flow path 14 (see FIG. 2) to be a closed state during leak detection for detecting a leak of a gaseous mixture AR or the like (hereinafter, simply referred to as a "leak").

As illustrated in FIG. 1, the open state allows the gaseous mixture AR to pass through the external flow path 14 to flow into the combustion chamber 111, and then the gaseous mixture AR is subjected to combustion. This enables the piston 12 to move. A part of the gaseous mixture AR passing through the external flow path 14 flows into the second auxiliary flow path 18 from the middle of the external flow path 14, and sequentially passes through the buffer chamber 113 and the internal flow path 114 to reach the crank chamber 112. The gaseous mixture AR having flowed into the crank chamber 112 can return to the external flow path 14 through the first auxiliary flow path 16.

As illustrated in FIG. 2, the closed state allows supply of the gaseous mixture AR to the internal combustion engine 10 to be stopped. When the combustion chamber 111 has high pressure due to combustion, a part of a blow-by gas Q in the combustion chamber 111 passes through the piston 12 to flow into the crank chamber 112. After that, the blow-by gas Q in the crank chamber 112 flows into the external flow path 14 through the first auxiliary flow path 16. At this time, when no leakage occurs, pressure in the crank chamber 112 decreases with time. When the pressure in the crank chamber 112 falls below a threshold value, it is determined that no leak has occurred. In contrast, when leakage occurs, the pressure in the crank chamber 112 does not decrease to be prevented from falling below the threshold value, or the pressure is likely to decrease gently to take time to fall below the threshold value. In this case, it is determined that leakage has occurred.

Figure 3:
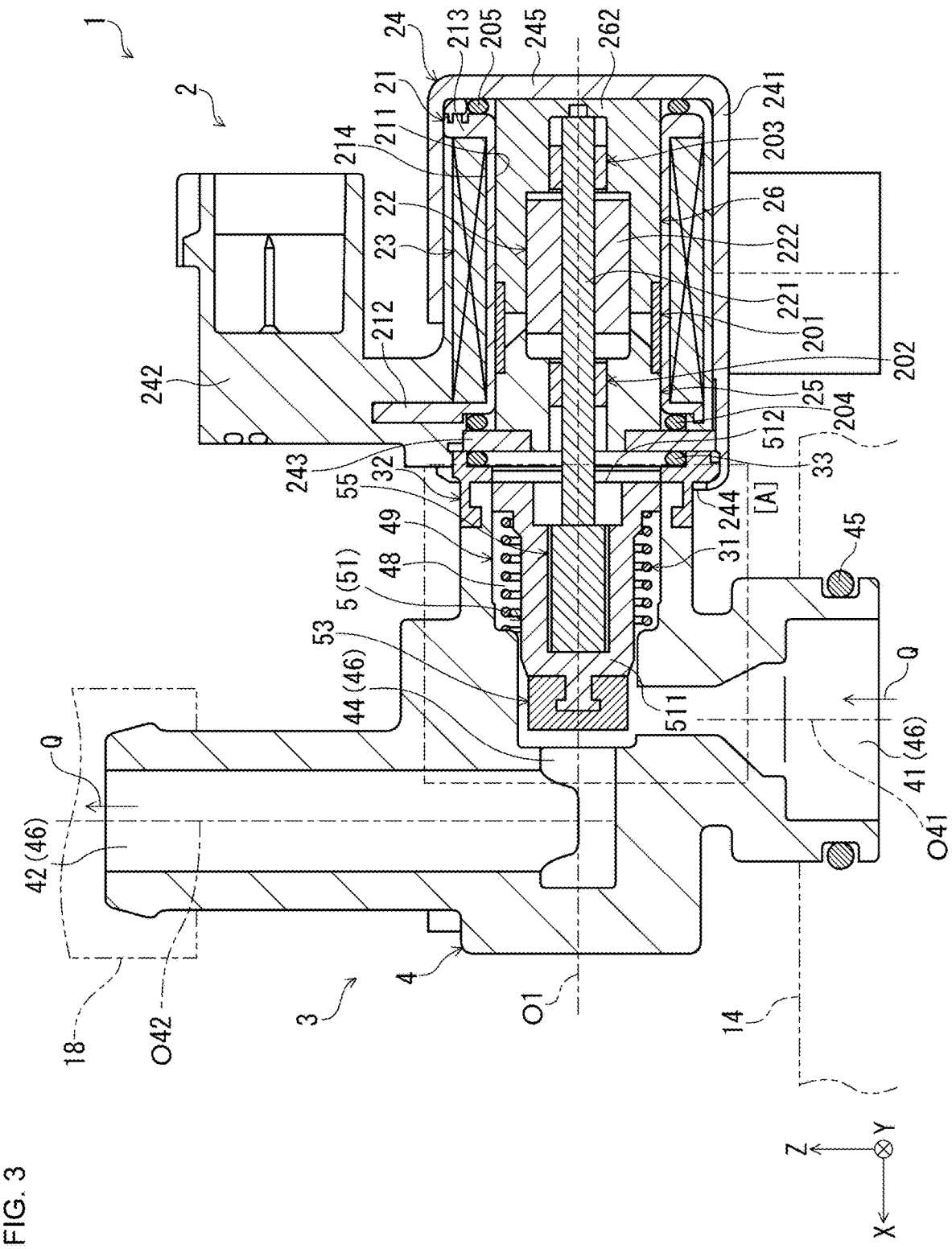
FIG. 3 is a sectional view illustrating an embodiment of the electromagnetic valve of the present invention.

As illustrated in FIG. 3, the electromagnetic valve 1 includes a solenoid 2 disposed on the negative side in the X-axis direction and a valve mechanism 3 disposed on the positive side in the X-axis direction. Hereinafter, a configuration of each unit will be described.

The solenoid 2 includes a bobbin 21, a plunger 22, a coil 23, a case 24, a core 25, and a yoke 26.

The bobbin 21 is a tubular member provided with a through-hole 211. The through-hole 211 passes through the bobbin 21 along the axis O1 direction parallel to the X-axis direction. The through-hole 211 has an inner diameter that is constant along the axis O1 direction. The bobbin 21 is provided on one side with a flange 212 protruding in the radial direction and on the other side with a flange 213 protruding in the radial direction. The bobbin 21 is made of, for example, various kinds of resin material, such as a polyester resin and a polyimide resin.

The bobbin 21 has an outer peripheral portion 214 around which the coil 23 having conductivity is wound. When the coil 23 is brought into an energized state, or when the coil 23 is energized, a magnetic circuit is formed by the bobbin 21, the core 25, and the yoke 26, to generate a magnetic force. This enables the plunger 22 to be moved along the axis O1 direction.

The bobbin 21 has the through-hole 211 into which the core 25 and the yoke 26 are inserted, and the plunger 22 is inserted further inside.

The core 25 is disposed on one side in the axis O1 direction, and the yoke 26 is disposed on the other side in the axis O1 direction.

The core 25 has a cylindrical shape as a whole and is disposed parallel to the X-axis direction. The yoke 26 also has a cylindrical shape as a whole and is disposed parallel to the X-axis direction. The core 25 and the yoke 26 are each made of a soft magnetic material such as iron, or made of a soft magnetic metal material. This enables generating a magnetic circuit in a level allowing the plunger 22 to be sufficiently moved.

The solenoid 2 includes a coupling member 201 that couples the core 25 and the yoke 26 in a separated state in the through-hole 211. The coupling member 201 has a cylindrical shape, and is fitted inside with the other end portion of the core 25 and one end portion of the yoke 26. The coupling member 201 is made of a non-magnetic metal material having resistance to rust, such as austenitic stainless steel.

The plunger 22 is disposed over the core 25 and the yoke 26, and is supported to be alternately movable to one side and the other side along the axis O1 direction, or to be able to reciprocate.

The plunger 22 includes a plunger body 222 in a cylindrical shape and a plunger pin 221 inserted in the plunger body 222. The plunger pin 221 protrudes to both the one side and the other side in the axis O1 direction. The yoke 26 has the other side closed by a wall portion 262, and the plunger pin 221 comes into contact with the wall portion 262, or collides with the wall portion 262, and thus a movement limit of the plunger 22 to the other side is restricted.

The plunger 22 is configured such that the plunger pin 221 is supported by a bush 202 in the core 25, and the plunger pin 221 is supported by a bush 203 in the yoke 26. This enables the plunger 22 to smoothly reciprocate.

The case 24 houses the bobbin 21, the plunger 22, the coil 23, the core 25, and the yoke 26. The case 24 includes a case body 241, a connector member 242, and a ring member 243.

The case body 241 has a bottomed tubular shape. That is, the case body 241 is a tubular member having an opening portion 244 opened on its one side in the axis O1 direction and a wall portion 245 closing its other side. The yoke 26 is in contact with the wall portion 245 from the one side.

The ring member 243 has an annular shape, and is disposed radially outward of the core 25 to be concentric with the core 25. The ring member 243 is in contact with the core 25 from the one side.

As with the core 25, the case body 241 and the ring member 243 are each made of a soft magnetic metal material such as iron.

The connector member 242 is connected to a connector (not illustrated) used for energizing the coil 23. As with the bobbin 21, the connector member 242 is made of, for example, a resin material.

The solenoid 2 includes the case 24 that is provided inside with a gasket 204 disposed between the ring member 243 and the flange 212 of the bobbin 21, and a gasket 205 disposed between the wall portion 245 of the case body 241 and the flange 213 of the bobbin 21.

The gasket 204 has a ring shape, and is disposed on an outer peripheral side of the core 25 to be concentric with the core 25. The gasket 204 is compressed between the ring member 243 and the flange 212 of the bobbin 21, thereby being able to seal between the ring member 243 and the flange 212.

The gasket 205 has a ring shape, and is disposed radially outward of the yoke 26 to be concentric with the yoke 26.

The gasket 205 is compressed between the wall portion 245 of the case body 241 and the flange 213 of the bobbin 21, thereby being able to seal between the wall portion 245 and the flange 213.

The gasket 204 and the gasket 205 are each made of an elastic material. The elastic material is not particularly limited, and examples thereof include various rubber materials such as urethane rubber and silicone rubber.

The valve mechanism 3 includes a flow path member 4, a valve element 5, a spring 31, a coupling member 32, and a gasket 33.

The flow path member 4 is coupled to the solenoid 2, and includes a fluid passage flow path 46 through which the blow-by gas Q, which is a fluid, can pass, and a valve element housing portion 49 communicating with the fluid passage flow path 46. As with the bobbin 21, the flow path member 4 is made of, for example, a resin material.

The fluid passage flow path 46 includes a first flow path 41, a second flow path 42, and a relay flow path 44 allowing the first flow path 41 to communicate with the second flow path 42.

The first flow path 41 is provided along the Z-axis direction and opens toward the negative side in the Z-axis direction. The first flow path 41 is connected to the external flow path 14 to communicate with the combustion chamber 111 through the external flow path 14. The flow path member 4 is provided with a gasket 45 fitted from outside to seal a gap between the flow path member 4 and a pipe constituting the external flow path 14.

The second flow path 42 is also provided along the Z-axis direction and opens toward the positive side in the Z-axis direction. The second flow path 42 has a central axis O42 located on the positive side in the X-axis direction with respect to a central axis O41 of the first flow path 41. The second flow path 42 is connected to, for example, the second auxiliary flow path 18.

Between the first flow path 41 and the second flow path 42, the relay flow path 44 is provided along the X-axis direction, or the axis O1 direction. The relay flow path 44 allows the first flow path 41 to communicate with the second flow path 42. For example, when the internal combustion engine 10 equipped with the electromagnetic valve 1 is a natural intake type engine, the blow-by gas Q flows from the first flow path 41 toward the second flow path 42 through the relay flow path 44 as illustrated in FIG. 3.

The valve element housing portion 49 is disposed adjacent to the fluid passage flow path 46 on the negative side in the X-axis direction. The valve element housing portion 49 has a tubular space 48 provided along the X-axis direction. The valve element 5 is housed in the tubular space 48 to be movable along the X-axis direction (axis O1 direction). The tubular space 48 communicates with the relay flow path 44 on the positive side in the X-axis direction and communicates with the first flow path 41 on the negative side in the Z-axis direction (radially outside). When flowing from the first flow path 41 toward the second flow path 42, the blow-by gas Q passes through the tubular space 48 and the relay flow path 44 in this order.

Figure 4:
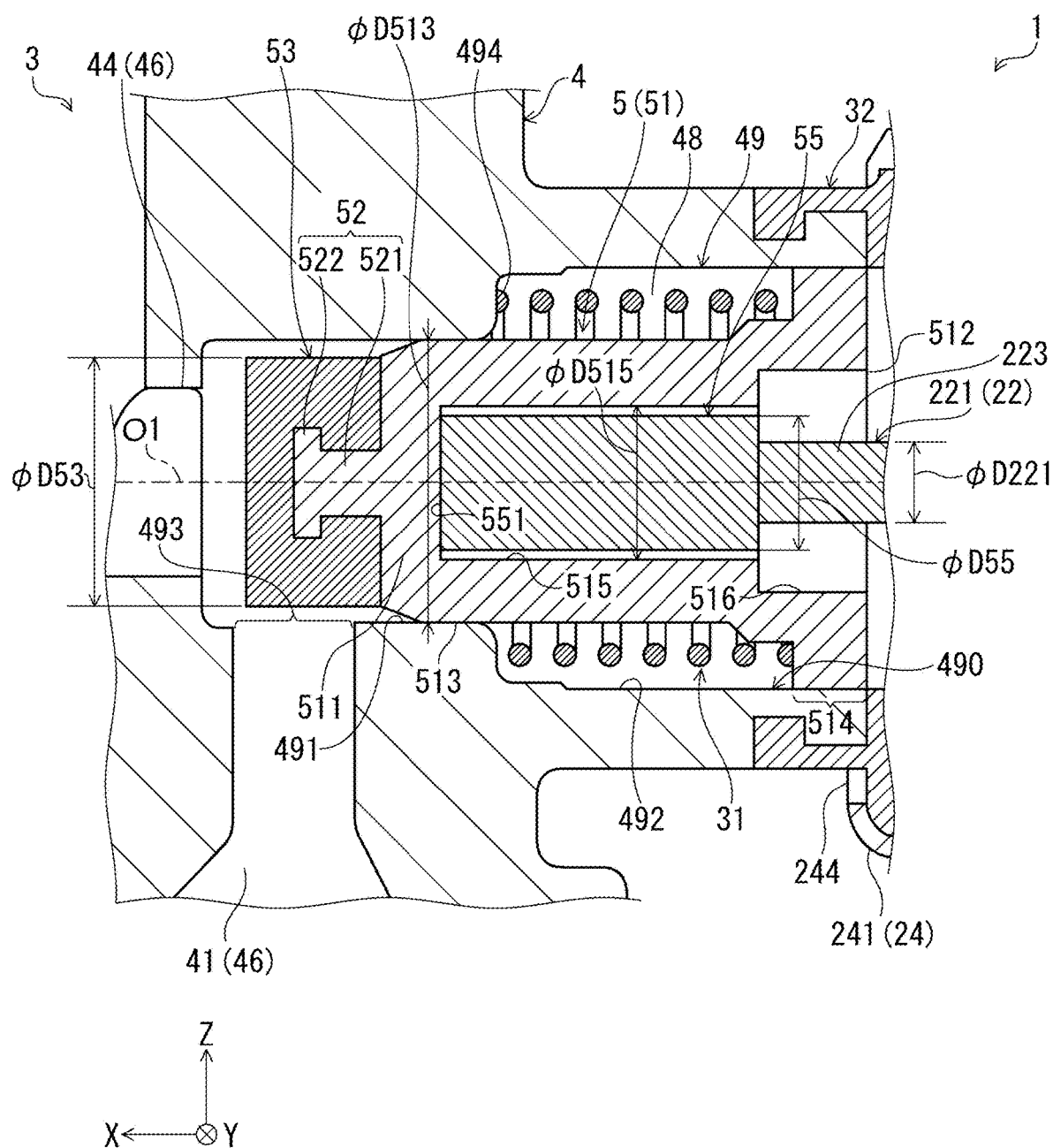
FIG. 4 is an enlarged view of a region [A] surrounded by a two-dot chain line in FIG. 3.

As illustrated in FIG. 4, the valve element housing portion 49 includes an inner peripheral portion 490 provided with a reduced diameter portion 491 having a reduced inner diameter and an increased diameter portion 492 having an increased inner diameter. The reduced diameter portion 491 is located on the one side in the axis O1 direction in the inner peripheral portion 490, and the increased diameter portion 492 is located on the other side in the axis O1 direction in the inner peripheral portion 490. The first flow path 41 is connected to the reduced diameter portion 491 from the negative side in the Z-axis direction. Hereinafter, a portion where the first flow path 41 is connected to the reduced diameter portion 491 is referred to as a "connection portion 493".

As illustrated in FIG. 3, the coupling member 32 is disposed on the negative side in the X-axis direction of the valve element housing portion 49. The coupling member 32 has a ring shape and is fixed on an outer peripheral side (radially outer side) of the valve element housing portion 49. The case body 241 of the solenoid 2 is fixed to the coupling member 32 by crimping, for example. This causes the solenoid 2 and the flow path member 4 to be coupled to each other.

The gasket 33 is disposed between the coupling member 32 and the ring member 243 of the solenoid 2 while being compressed. The gasket 33 has a ring shape and is provided concentrically with the valve element housing portion 49. The gasket 33 can seal between the coupling member 32 and the ring member 243, so that leakage of the blow-by gas Q from between them, or between the flow path member 4 and the solenoid 2, can be prevented. As with the gasket 204, the gasket 33 is made of, for example, an elastic material such as urethane rubber.

As illustrated in FIG. 4, the valve element 5 is housed and disposed in the valve element housing portion 49. The valve element 5 can move along the axis O1 direction together with the plunger 22. When the valve element 5 moves, the relay flow path 44 can be opened or closed. That is, the relay flow path 44 can be switched between an open state and a closed state. The open state enables passage of the blow-by gas Q in the fluid passage flow path 46. FIG. 3 illustrates the open state. In contrast, the closed state blocks the passage of the blow-by gas Q in the fluid passage flow path 46.

The valve element 5 includes a body part 51, a valve part 53, and a pin 55.

The body part 51 has a tubular shape including a wall portion 511 that closes one end side in the axis O1 direction and an opening 512 that opens to the other side in the axis O1 direction, or a bottomed tubular shape. The body part 51 is disposed in the valve element housing portion 49 (tubular space 48) in an attitude in which a central axis thereof is parallel to the axis O1. As with the bobbin 21, the body part 51 is made of, for example, a resin material.

The body part 51 includes a first guide portion 513 and a second guide portion 514 on an outer peripheral portion thereof.

The first guide portion 513 is provided in an outer peripheral portion of the body part 51 on the one end side in the axis O1 direction, and is a constant outer diameter portion having a constant outer diameter along the axis O1. The first guide portion 513 is in contact with the reduced diameter portion 491 (inner peripheral portion 490) of the valve element housing portion 49. As a result, when the valve element 5 moves along the axis O1 direction, the first guide portion 513 slides by being guided by the reduced diameter portion 491, and thus the valve element 5 can stably move.

The second guide portion 514 is a flange portion provided in the outer peripheral portion of the body part 51 on the other side in the axis O1 direction with respect to the first guide portion 513 and having a larger outer diameter than the first guide portion 513. The second guide portion 514 is in contact with the increased diameter portion 492 (inner peripheral portion 490) of the valve element housing portion 49. As a result, when the valve element 5 moves along the axis O1, the second guide portion 514 slides by being guided by the increased diameter portion 492. The valve element 5 can further stably move together with the guide using the reduced diameter portion 491 of the first guide portion 513.

The body part 51 includes a small diameter portion 515 and a large diameter portion 516 on an inner peripheral portion thereof.

The small diameter portion 515 is provided in the inner peripheral portion of the body part 51 on one end side in the axis O1 direction, and has an outer diameter constant along the axis O1. As described later, a core member 55 is disposed in the small diameter portion 515. The small diameter portion 515 has a total length equal to a total length of the core member 55.

The large diameter portion 516 is provided on the other side in the axis O1 direction with respect to the small diameter portion 515 in the inner peripheral portion of the body part 51, and has a larger outer diameter than the small diameter portion 515. Although the large diameter portion 516 also has a constant outer diameter along the axis O1 as with the small diameter portion 515, it has a shorter total length than the small diameter portion 515.

The valve element 5 includes a fixing portion 52 that fixes the valve part 53 on one side in the axis O1 direction of the body part 51. The fixing portion 52 includes a protruding portion 521 protruding in a columnar shape from the wall portion 511 toward the one side in the axis O1 direction, and an increased diameter portion 522 having a diameter increased radially outward from an outer peripheral portion of the protruding portion 521. The valve part 53 is engaged with the fixing portion 52 from the outside in the radial direction. This causes the valve part 53 to be hooked by the fixing portion 52, so that the valve part 53 is prevented from being detached from the body part 51, or is prevented from coming off from the body part 51.

As the valve part 53 moves together with the plunger 22, the valve part 53 can approach the relay flow path 44 to close the relay flow path 44, or can separate from the relay flow path 44 to open the relay flow path 44. Thus, the valve part 53 functions as a member that opens and closes the relay flow path 44.

The valve part 53 has, for example, a columnar or plate-like shape. The valve part 53 has an outer diameter φD53 that is smaller than an outer diameter φD513 of the first guide portion 513 in contact with the reduced diameter portion 491 of the valve element housing portion 49. This prevents the valve part 53 from coming into contact with the reduced diameter portion 491, so that movement of the valve element 5 can be prevented from being hindered by the valve part 53.

As with the gasket 204, the valve part 53 is made of, for example, an elastic material such as urethane rubber.

The core member 55 is disposed inside the body part 51, or in the small diameter portion 515. The core member 55 has a columnar shape and is disposed to be movable along the axis O1 direction coaxially with the body part 51. The core member 55 is in contact with the wall portion 511 on the one side in the axis O1 direction and is in contact with the plunger pin 221 of the plunger 22 on the other side in the axis O1 direction. As a result, when the plunger 22 moves toward the one side in the axis O1 direction, the core member 55 can transmit pressing force from the plunger 22 to the valve part 53 using the wall portion 511. This enables the valve part 53 to approach the relay flow path 44 to close the relay flow path 44 to form a closed state.

The body part 51 is preferably pressed on its one side in the axis O1 direction as much as possible. In the present embodiment, the body part 51 is pressed by the core member 55 in contact with the wall portion 511, and thus is configured to "press the one side in the axis O1 direction as much as possible". This prevents the body part 51 (valve element 5) from being displaced from the axis O, so that the body part 51 can move stably and smoothly. As a result, the valve part 53 can quickly switch between opening and closing of the relay flow path 44.

The first guide portion 513 is located radially outside the wall portion 511. This further prevents the body part 51 from being displaced from the axis O using the first guide portion 513, so that the body part 51 is improved in stability when moving.

As illustrated in FIG. 4, when at least the valve part 53 opens the relay flow path 44, a contact surface 551 with the wall portion 511 of the core member 55 is located on the other end side in the axis O1 direction with respect to the connection portion 493 of the reduced diameter portion 491. This enables the valve part 53 to be sufficiently separated from the relay flow path 44, for example, so that the blow-by gas Q can smoothly pass through from the first flow path 41 to the second flow path 42 without excess or deficiency. Although depending on a thickness (length in the direction of the axis O1) of the valve part 53, in the closed state, the contact surface 551 may be located on the other end side or on the one side in the axis O1 direction with respect to the connection portion 493 of the reduced diameter portion 491, or at the same position as the connection portion 493 in the axis O1 direction.

The core member 55 has an outer diameter φD55 that is larger than an outer diameter φD221 of the plunger pin 221 of the plunger 22. This enables securing a large contact area of the core member 55 with the plunger pin 221. Even when the core member 55 repeatedly comes into contact with the plunger pin 221, wear of the core member 55 due to this contact can be reduced.

The small diameter portion 515 of the body part 51 and the core member 55 are in a relationship of fitting. The fitting includes an interference fit, an intermediate fit, and a clearance fit. In the present embodiment, the small diameter portion 515 and the core member 55 are preferably in a relationship of the clearance fit particularly. The inner diameter φD515 of the small diameter portion 515 is larger than the outer diameter φD55 of the core member 55. For example, the clearance fit can be configured such that when the inner diameter φD515 has a tolerance range (dimensional tolerance) of "H7", the outer diameter φD55 has a tolerance range of "f6", "h7", or "h6". The clearance fit described above enables the core member 55 to be easily moved along the axis O1 direction in the small diameter portion 515.

The large diameter portion 516 is connected to the small diameter portion 515. As a result, when the core member 55 is inserted into the small diameter portion 515 from the opening 512, the core member 55 can be moved toward the small diameter portion 516 after once passing through the large diameter portion 515. This enables facilitating insertion operation of the core member 55.

The core member 55 is not particularly limited in constituent material, and for example, a metal material such as stainless steel can be used. This enables pressing force from the plunger to be stably received. Even when the core member 55 repeatedly comes into contact with the plunger pin 221, damage of the core member 55 due to its wear can be prevented.

In the valve element housing portion 49, the spring 31 is disposed. The spring 31 is a pressing member that presses the valve element 5 toward the other side in the axis O1 direction. The valve element 5 can move toward the other side in the axis O1 direction by being pressed by the spring 31 while the energized state for the coil 23 is released. This enables the valve part 53 to be separated from the relay flow path 44 to open the relay flow path 44 to form an open state.

As the spring 31, for example, a coil spring is preferably used. This enables the spring 31 to be disposed concentrically with the valve element 5 around an outer periphery of the valve element 5 in the valve element housing portion 49. Then, the spring 31 comes into contact with not only a stepped portion 494 that is a boundary portion between the reduced diameter portion 491 and the increased diameter portion 492 on the one side in the axis O1 direction, but also the second guide portion 514 on the other side in the axis O1 direction to be brought into a compressed state. This enables the valve element 5 to be stably pressed without excess or deficiency.

Although the electromagnetic valve of the present invention is described with reference to the illustrated embodiment, the present invention is not limited thereto, and each part constituting the electromagnetic valve can be replaced with a part having any configuration capable of exhibiting similar functions. Additionally, an arbitrary component may be added.

Although the electromagnetic valve 1 is mounted and used in the vehicle 100 equipped with the internal combustion engine 10 such as an engine in the above embodiment, the application place of the electromagnetic valve is not limited to the vehicle 100. The fluid that is switched between passage and interruption by the electromagnetic valve 1 is not limited to the gas (blow-by gas Q), and may be a liquid or a mixture of gas and liquid.

Although the electromagnetic valve 1 is configured to allow the blow-by gas Q to flow from the first flow path 41 toward the second flow path 42 in the embodiment described above, the blow-by gas Q is also allowed to flow from the second flow path 42 toward the first flow path 41 depending on a use state of the electromagnetic valve 1.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electromagnetic valve comprising:
   a solenoid including:
      a bobbin in a tubular shape provided with a through-hole passing through the bobbin along an axial direction;
      a plunger inserted in the through-hole and movably supported along the axial direction; and
      a coil wound around an outer peripheral portion of the bobbin and generating a magnetic force with energization to move the plunger in the axial direction;
   a flow path member including:
      a fluid passage flow path having a first flow path, a second flow path, and a relay flow path disposed between the first flow path and the second flow path to allow the first flow path to communicate with the second flow path; and
      a valve element housing portion having a tubular space communicating with the relay flow path, the flow path member being coupled to the solenoid; and
      a valve element disposed in the valve element housing portion and movable along the axial direction together with the plunger,
   the valve element including:
      a body part in a tubular shape that is provided on one axial end side with a wall portion closing the body part and on another axial side with an opening;
      a valve part that is fixed to one axial side of the wall portion and that opens and closes the relay flow path as the plunger moves; and
      a core member in a columnar shape that is disposed movably along the axial direction inside the body part and that is in contact with the wall portion on the one axial side, and is in contact with the plunger on the other axial side,
   wherein the valve element housing portion includes an inner peripheral portion provided with a reduced diameter portion having an inner diameter reduced on the one axial side and an increased diameter portion having an inner diameter increased on the other axial side, and
   wherein the body part includes an outer peripheral portion provided with a first guide portion guided to the reduced diameter portion and a second guide portion guided to the increased diameter portion.

2. The electromagnetic valve according to claim 1, wherein
   when the valve part closes the relay flow path, the core member transmits pressing force from the plunger to the valve unit using the wall portion.

3. The electromagnetic valve according to claim 1, wherein
   the body part and the core member are in a relationship of a clearance fit.

4. The electromagnetic valve according to claim 1, wherein
   the core member has a larger outer diameter than a plunger pin of the plunger.

5. The electromagnetic valve according to claim 1, wherein
   the body part is made of a resin material, and the core member is made of a metal material.

6. The electromagnetic valve according to claim 1, wherein
   the first guide portion is located radially outside the wall portion.

7. The electromagnetic valve according to claim 1, wherein
   the first flow path communicates with the relay flow path through the valve element housing portion, and
   when at least the valve part opens the relay flow path, a contact surface of the core member with the wall portion is located on another axial end side with respect to a connection portion where the reduced diameter portion is connected to the first flow path.

8. The electromagnetic valve according to claim 1, wherein
   the valve element housing portion is provided inside with a pressing member that presses the valve element toward the other axial side.

9. The electromagnetic valve according to claim 8, wherein
   the valve element is moved toward the other axial side while being in contact with the inner peripheral portion of the valve element housing portion by being pressed by the pressing member.

10. The electromagnetic valve according to claim 8, wherein the pressing member is a spring that is disposed concentrically with the valve element around an outer periphery of the valve element in the valve element housing portion while being in contact with not only a boundary portion between the reduced diameter portion and the increased diameter portion on one axial side, but also the second guide portion on the other axial side to press the valve element along the axial direction.

* * * * *